UNITED STATES PATENT OFFICE.

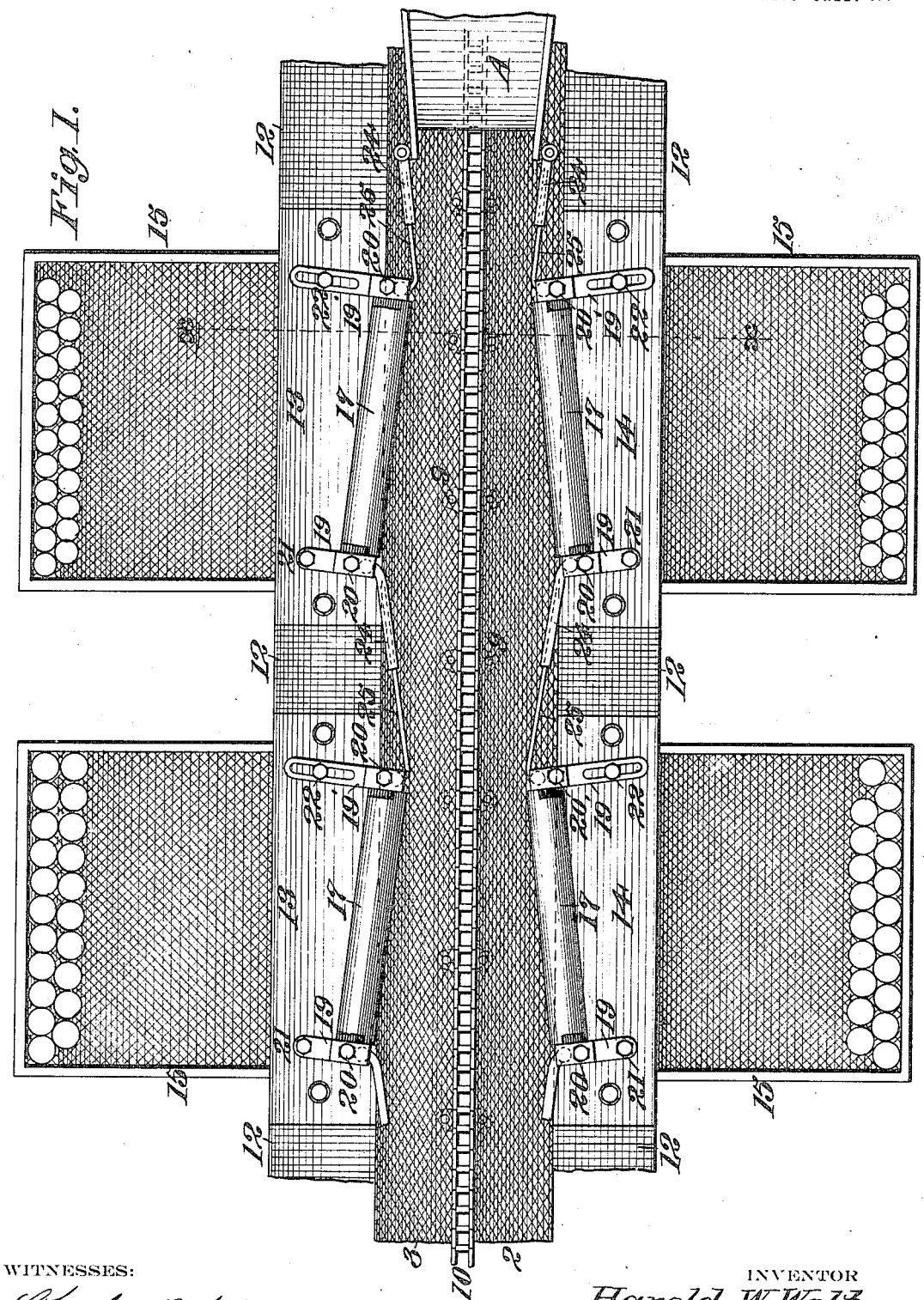

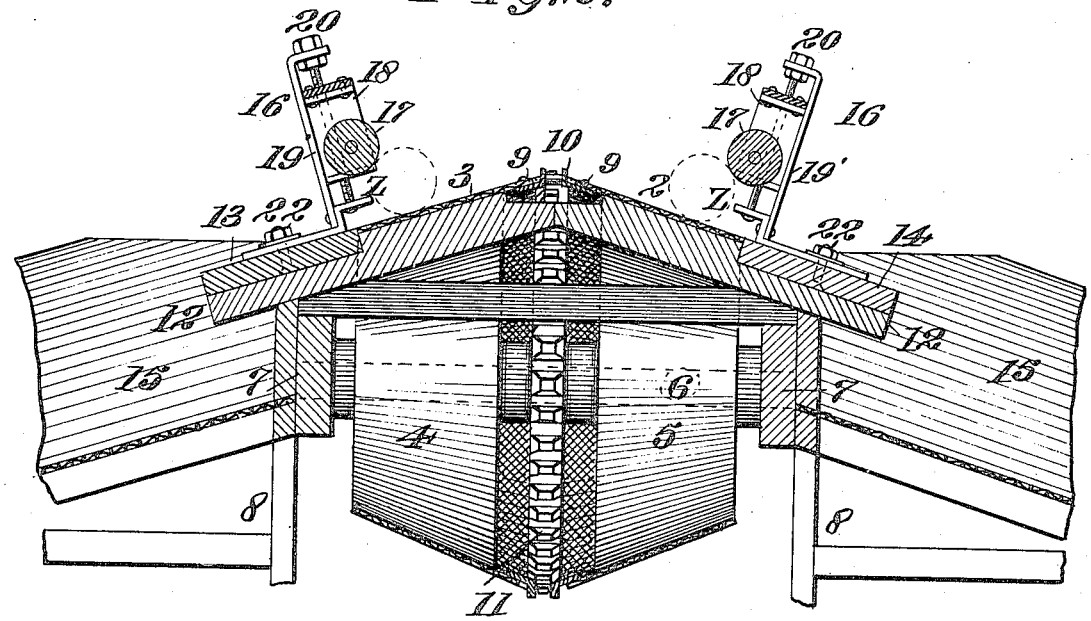
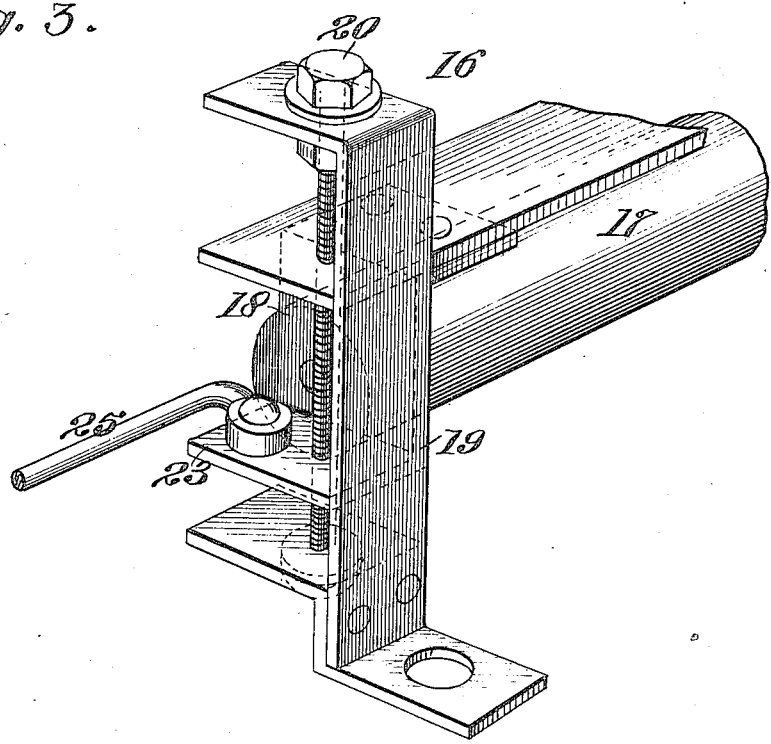

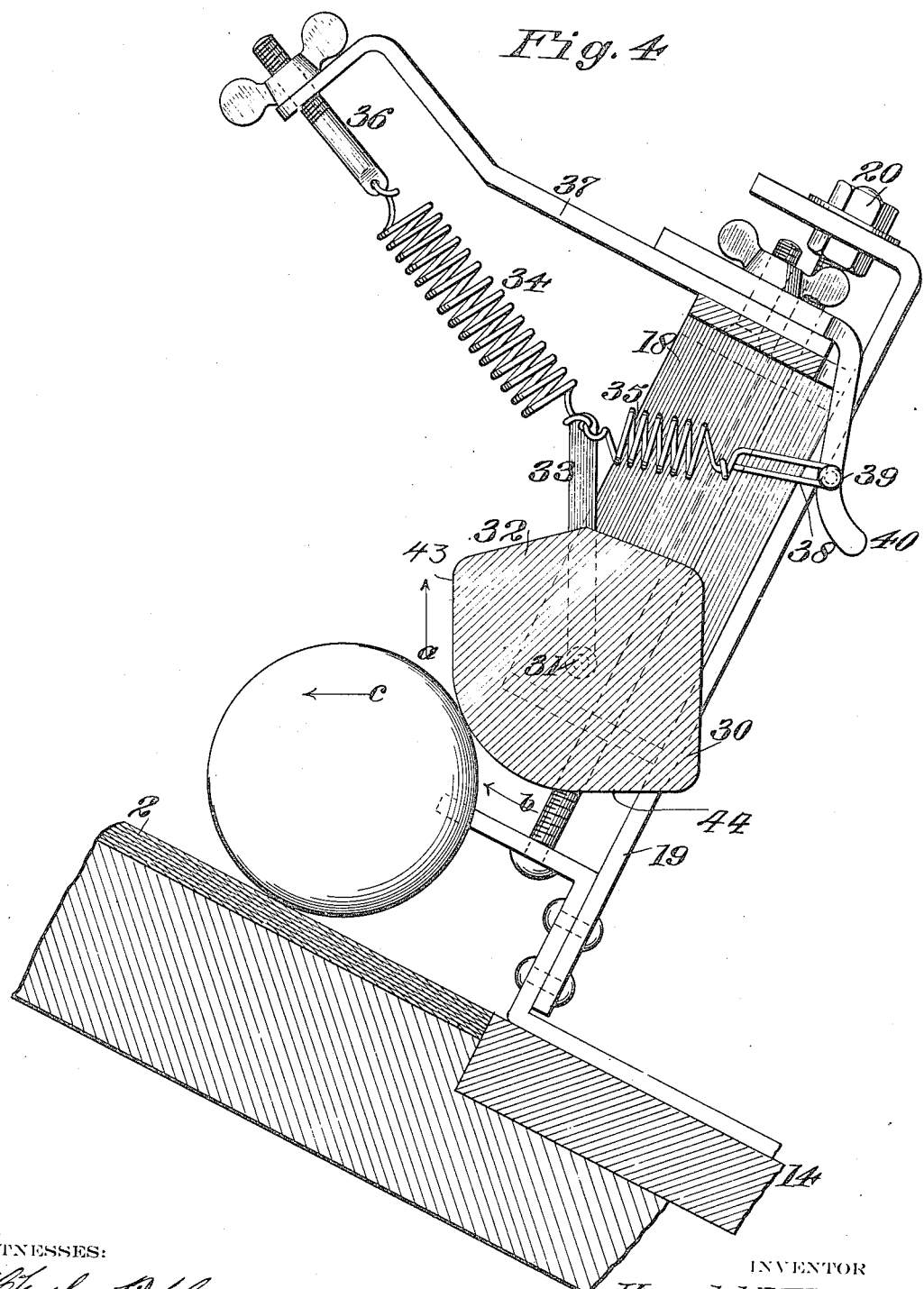

HAROLD W. WELTON, OF REDLANDS, CALIFORNIA.

FRUIT-GRADING MACHINE.

1,140,782. Specification of Letters Patent. Patented May 25, 1915.

Application filed February 4, 1914. Serial No. 816,477.

*To all whom it may concern:*

Be it known that I, HAROLD W. WELTON, a citizen of the United States, residing at Redlands, in the county of San Bernardino and State of California, have invented new and useful Improvements in Fruit-Grading Machines, of which the following is a specification.

This invention relates to a fruit grading machine.

The object of the invention is to provide a simple, substantial, easily adjusted fruit grading machine which is particularly adapted for separating oranges and like fruits into classes of various sizes.

Another object of the invention is to provide means for adjusting the position of the grading elements so as to insure a superior and more positive grading action, and also to prevent the cells of the outer surface of the orange skin from being bruised.

The invention further consists of improvements in the construction and operation of the grading elements, and in certain other novel arrangements and combinations which will be hereinafter more particularly set forth and described in the accompanying specifications and drawings, in which—

Figure 1 is a plan view partly broken away, showing the position of the grading elements with relation to the fruit conveying belts. Fig. 2 is a cross section on line X—X, Fig. 1. Fig. 3 is a perspective view of the bracket, with connected adjusting mechanism, in which the fruit grading element is mounted. Fig. 4 is another cross section showing a modified form of the fruit grading element.

Referring to the drawings, A indicates a feed chute through which the oranges to be graded may be delivered to a pair of angularly disposed conveyer belts 2 and 3. These belts are carried by pulleys 4 and 5, keyed to a shaft 6, suitably journaled, as at 7, in a main supporting frame 8. The upper edges of the belts are secured, as at 9, to a sprocket chain 10, which in turn is carried by a sprocket wheel 11 interposed between the pulleys 4 and 5 and also secured to the shaft 6. The sprocket, with connected pulleys 4 and 5, may be driven by a pulley or other means not here shown. It is understood that the opposite end of the chain, with connected belts, is similarly supported. The belts and chain intermediate of the supporting pulleys are supported by a longitudinally disposed supporting frame or base plate 12, on the outer edge of which is mounted secondary, longitudinally disposed supporting frames 13 and 14 which may be adjusted longitudinally with relation to the frame 12. The main supporting frame is furthermore provided with a number of bins 15, of suitable construction, into which the various sizes of graded oranges may be discharged when liberated by the grading elements hereinafter to be described.

Suitably secured upon the longitudinally disposed supporting frames 13, and similarly secured upon the longitudinally disposed frames 14 in juxtaposition with the receiving bins 15, is a grading element, generally indicated at 16, there being usually one for each bin. Each individual grading element consists of a roller 17 journaled in brackets 18, slidably and adjustably mounted upon the standards 19 and 19' respectively; vertical adjustment of the brackets 18 being secured through means of adjusting screws 20. Means have been provided by which each individual grading element may be angularly adjusted with relation to the straight traveling belts 2 and 3. This is accomplished in the following manner: The standard 19 is pivotally secured to its supporting frame 13 or 14, as indicated at 21, while the base of the opposite standard 19' is slotted on an arc struck from the pivot point 21. This permits the standard 19' to be moved inwardly or outwardly with relation to the adjoining conveyer belt so as to position the grading roller 17 at an angle with relation to the line of travel of said belt, and it may be locked in this position by a bolt or any other suitable means, indicated at 22.

The lower end of each sliding bracket 18 is provided with a horizontally disposed lug 23, to which is pivotally secured a tubular member 24, and similarly secured to the adjoining bracket 18 on the following grading element is a rod 25 which is adapted to telescope within the tubular member 24. The telescoping members 24 and 25 are provided as guides for the purpose of constituting, in actual practice, a stable and continuous runway, conveying the fruit from one grading element to the other, and the pivotal connections, formed between the telescoping members and the adjustable brackets 18, are provided for the purpose of permitting the angular adjustment of the grading elements, as previously described.

The means for providing an angular adjustment of the grading elements or rollers 17, with relation to the straight path of travel of the adjoining fruit conveying belts, together with the improved form of grading element hereafter to be described, constitute the main novelty of the present invention and the operation and function of same will be as follows: Oranges delivered through the feed chute A will immediately roll down to the lower side of one or the other of the conveying belts 2 and 3 and will follow along the telescoping guide members until the first set of grading rollers 17 is encountered. The larger oranges will simply follow along the face of the angularly disposed roller until the next guide member is encountered and will then roll along this to the following grading element and so on until the grading element having the right adjustment is encountered. The orange will then roll in under the grading element and discharge into the connected bin 15. The forward movement of the conveying belts, with relation to any one of the grading rollers 16 will cause the oranges to roll and constantly turn, with relation to the lower face or side of same, and any orange being just a little too large to pass through the opening below the face of the roller will naturally have a tendency to squeeze under the face of the roller because of gravity, even though it may be released back upon the conveying belt by the upward rotation of the roller, caused by the pressure of the orange upwardly on the roller and the onward motion of the belt. This method of overcoming gravity by pressure on the roller and consequent squeezing of the fruit it is sought to improve upon in the device here shown, the object of which is to reduce the squeezing or pressure to a minimum and to take the maximum advantage of the movement of the conveyer belt. This object is accomplished in the present apparatus by placing the roller in a position at an angle with relation to the line of travel of the fruit conveying belt, as indicated in the plan view of Fig. 1. The forward or near end of the grading roller, or that end which is mounted in standard 19', is placed closer to the longitudinal center of the conveying belt than the other or further end of the roller. The fruit, say, oranges, which is not pretty near the size adapted to be freed through the opening between a given roller and the surface of the conveying belt will move freely along the side of the roller. When fruit comes along of a size having a tendency to sink into the space Z—Z, Fig. 2, between the roller and belt, but not of a small enough diameter to escape through the opening under the roller, it will, because of the angular position of the roller, as above shown, have a tendency to be quickly and gently freed from the damaging squeezing which gravity tends to cause. The onward motion of the conveyer belt, operating diagonally across the line of axis of the roller, tends always to carry the fruit away from the squeezing or too tight contacting of fruit with and between the belt and the roller. The bruising action upon the cell structure of the outer skin is thus entirely eliminated and a superior and more positive grading action is secured, since the only force which carries the fruit through the opening under the roller is that of gravity, permitted by the laterally inclined position of the belt. Each successive grading element, or set thereof, is so adjusted as to allow the smaller oranges to escape first into the bins, and then by successively increased spaces between the conveyer belt and rollers in successive grading elements the larger sizes are freed.

The improved form of grading element shown in Fig. 4 consists of a bar 30 of suitable length. This bar is provided with a pivot member 31 in each end by which the bar is supported in brackets 18 in a manner similar to the rollers 16, previously described. The inner corner, or that surface which is presented toward the fruit to be graded, is cylindrical in shape, while the upper surface is flat, as indicated at 32. Projecting from the upper surface, about midway between the ends of the bar, is an arm 33 to which a pair of coil springs 34 and 35 are secured. The opposite end of spring 34 is secured to an adjusting screw 36, carried by a stationary bracket arm 37, while the opposite end of spring 35 is secured to a loop member 38 slidably mounted upon a pin 39 carried on the lower end of an adjustable arm 40. The opposite end of arm 40 is slotted, as at 41, and is adjustably secured to arm 37 by means of a thumb screw, or other suitable means, 42.

The operation of the improved grading element constructed and mounted as here shown will be as follows: An orange, just a little too large to pass between the lower cylindrical surface of the bar 30, will have a tendency to cause an upward pressure on the roller in the direction of arrow $a$, as indicated in Fig. 4. This will slightly rock the bar in the direction of arrow $b$, and this rocking movement will consequently have a tendency to roll the orange away from the bar in the direction of arrow $c$. The orange is thus automatically rolled away from the bar 30 and this is permitted to return to normal position which is controlled by the springs 34 and 35. The rocking of the element in the direction of arrow $b$ causes a slight tension on spring 34 and this tension is sufficient to return the bar to the normal position indicated in Fig. 4. The spring 35 is provided for the purpose of counteracting the pull of spring 34, and the pull of the two springs in opposite directions will prevent the bar from rocking any more than is necessary. Spring 35 is also provided for the purpose of resisting any movement of the bar 30 in the direction opposite to that indicated by arrow $b$. This movement is sometimes produced by an orange contacting with the lower surface of the bar when passing through to the connected bin. The action of the rocking bar 30 has been found quite superior to a roller for the reason that the tension of the springs 34 and 35 has a tendency to limit the rocking movement of the bar and will thus decrease the tendency to bruise the cell structure of the outer skin of the orange. The inner flat side of the bar, indicated at 43, normally acts as one side of a runway for the fruit which is too large to pass under. The large fruit is therefore subjected to very little friction, as a slight rocking movement of the bar, if any, will only tend to throw the fruit out of contact with the same. The lower flat surface of the bar, indicated at 44, is thrown into operation when the bar is rocked to an extreme angle in the direction of arrow $b$. Surface 44 will then move downward and inward, thus shutting off the approach of the fruit until the bar has had a chance to return to normal position. These movements are almost instantaneous and do not cut off the approach of the fruit to the bin long enough to be even noticed.

I wish it understood that I do not desire to limit myself to the use of the particular counterbalancing spring structure here shown, as it is obvious that arm 33 may be otherwise connected and counteracted.

The materials and finish of the several parts of the apparatus are such as the experience and judgment of the manufacturer may dictate.

Having thus described my invention, what I claim and desire to secure by Letters Patent is—

1. In a fruit grading machine, a laterally inclined fruit conveying belt, and a plurality of idle grading elements angularly disposed with relation to the line of travel of the belt.

2. In a fruit grading machine, a laterally inclined fruit conveying belt, a plurality of grading elements, and adjustable supports for said elements by which the elements may be angularly adapted with relation to the line of travel of the belt.

3. In a fruit grading machine, a supporting frame, an endless fruit conveying belt having portions disposed at an angle to each other throughout its length mounted on said frame, and a plurality of grading elements angularly disposed with relation to the line of travel of the belt.

4. In a fruit grading machine, a supporting frame, an endless laterally inclined fruit conveying belt mounted on said frame, a plurality of idle grading elements angularly disposed with relation to the line of travel of the belt, and telescoping guide members connecting the grading elements.

5. In a fruit grading machine, a plurality of idle sizing or grading members, and a laterally inclined fruit conveying belt for successively delivering fruit to said grading members, the line of travel of said belt being angularly disposed with relation to the longitudinal axis of the grading members.

6. In a fruit grading machine, a supporting frame, an endless laterally inclined fruit conveying belt mounted on said frame, a secondary supporting frame adjacent to the belt and parallel with the same, and a plurality of idle grading elements mounted on said frame, said elements being angularly disposed with relation to the line of travel of the belt.

7. In a fruit grading machine, a supporting frame, an endless laterally inclined fruit conveying belt mounted on said frame, a secondary supporting frame adjacent to the belt and parallel with the same, a plurality of idle grading rollers operating over said conveying belt, a pair of standards in which each roller is supported, said standards being mounted on the secondary frame, and means for adjusting the position of said standards on the secondary frame so that the longitudinal axis of the grading rollers will be angularly disposed with relation to the line of travel of the fruit conveying belt.

8. In a fruit grading machine, a supporting frame, an endless laterally inclined fruit conveying belt mounted on said frame, a secondary supporting frame adjacent to the belt and parallel with the same, a plurality of grading rollers operative over said conveying belt, a pair of standards in which each roller is supported, said standards being mounted on the secondary frame, means for adjusting the position of said standards on the secondary frame so that the longitudinal axis of the grading rollers will be angularly disposed with relation to the line of travel of the fruit conveying belt, and means for adjusting the position of the roller vertically with relation to the surface of the belt.

9. In a fruit grading machine, a supporting frame, an endless fruit conveying belt mounted on said frame, said belt having portions disposed at an angle to each other throughout its length, a secondary supporting frame adjacent to the belt and parallel with same, a plurality of idle grading rollers, a pair of standards for each roller, a bracket member on each standard in which the roller is mounted, means for raising and lowering said brackets, with connected roller, on the standards, means for adjusting the position of the standard on the secondary supporting frame, and telescoping guide members extending between each grading roller pivotally secured to the roller supporting brackets.

10. In a fruit grading machine, a supporting frame, an endless fruit conveying belt mounted on said frame, said belt having portions disposed at an angle to each other throughout its length, a secondary supporting frame adjacent to the belt and parallel with same, a plurality of idle grading rollers, a pair of standards in which each roller is supported, said standards being mounted on the secondary frame, means for adjusting the position of said standards on the secondary frame so that the longitudinal axis of the grading rollers will be angularly disposed with relation to the line of travel of the fruit conveying belt, and means for adjusting the secondary frame longitudinally.

11. In a fruit grading machine in combination, a fruit conveying belt having one edge thereof elevated, a plurality of grading elements angularly disposed with relation to the line of travel of said belt, the front ends of said grading elements being nearer the elevated edge of said conveying belt than the other ends.

12. In a fruit grading machine in combination, a plurality of idle grading rollers, a fruit conveying belt having one edge elevated and adapted to successively deliver fruit to said grading rollers, the fruit receiving ends of said rollers being nearer to said elevated edge than the other ends of said rollers.

13. In a fruit grading machine in combination, a conveying belt having one edge thereof elevated, and a plurality of idle grading rollers located above said belt, said grading rollers being angularly disposed with reference to the travel of said belt with the front ends of the rollers nearer the elevated edge of said belt than the other ends so that the tendency of the fruit to gravitate is partly overcome by the onward travel of the belt.

14. In a fruit grading machine in combination, a supporting frame, an endless fruit conveying belt mounted on said frame, means to support said belt in such manner as to maintain one edge thereof elevated, a secondary supporting frame adjacent the belt and parallel therewith, a plurality of loosely mounted grading rollers, a pair of standards in which each roller is supported, said standards being mounted on the secondary frame, and means for adjusting the position of said standards on the secondary frame so that the longitudinal axes of the grading rollers will be angularly disposed with relation to the line of travel of the fruit conveying belt, the rear ends of said rollers being farthest away from the elevated edge of said belt.

15. In a fruit grading machine in combination, a slanting fruit conveying belt, and a plurality of rotative grading elements angularly disposed with relation to the line of travel of the belt, and fruit receiving ends of said grading elements being nearer the top edge of the belt than are the fruit discharging ends of said elements.

16. In a fruit grading machine in combination, a fruit conveying belt disposed to move with its surface in a laterally inclined plane, a plurality of grading elements angularly disposed with relation to the line of travel of said belt, the front ends of said grading elements being nearer than the other ends thereof to the elevated edge of said belt.

17. In a fruit grading machine in combination, a plurality of idle grading rollers, a fruit conveying belt disposed to move with its surface in a laterally inclined plane and adapted to deliver fruit successively to said grading rollers, the fruit receiving ends of said rollers being nearer to the elevated edge of said belt than the other ends of said rollers.

In testimony whereof I have hereunto set my hand in the presence of two subscribing witnesses.

HAROLD W. WELTON.

Witnesses:
 H. H. FORD,
 C. C. HOLLOWAY.